United States Patent [19]

Bloom et al.

[11] Patent Number: 4,559,903
[45] Date of Patent: Dec. 24, 1985

[54] PET DRYER

[76] Inventors: Phyllis R. Bloom; Perry O. Sherrard, both of 8222 Delongpre #1, Los Angeles, Calif. 90046

[21] Appl. No.: 639,734

[22] Filed: Aug. 13, 1984

[51] Int. Cl.⁴ .................. A01K 1/02; A01K 13/00
[52] U.S. Cl. .................................. 119/19; 119/160
[58] Field of Search ................... 119/19, 15, 1, 160

[56] References Cited

U.S. PATENT DOCUMENTS

| | | | |
|---|---|---|---|
| 2,881,733 | 4/1959 | Young, Jr. et al. | 119/15 |
| 2,898,691 | 8/1959 | Moseman et al. | 119/160 X |
| 3,175,534 | 3/1965 | Pollard | 119/1 |
| 3,237,599 | 3/1966 | Torrey et al. | 119/19 |
| 3,557,756 | 1/1971 | Ramsey | 119/15 |
| 3,985,102 | 10/1976 | Yonezawa | 119/19 |
| 4,183,323 | 1/1980 | Maines | 119/19 |

*Primary Examiner*—Hugh R. Chamblee
*Attorney, Agent, or Firm*—Christie, Parker & Hale

[57] ABSTRACT

A pet dryer is set forth to retain and dry an animal. The dryer includes an inner shell spaced within an outer shell. At least one blower is provided and receives outside air from an inlet plenum defined between the shells. Each blower discharges the air past a heater to a discharge plenum also defined between the shells. Apertures admit the heated air from the discharge plenum into the inner shell for drying a pet. A door is provided for the inner shell having a vent to exhaust the air from the inner shell. A pet supporting grille is disposed above the apertured floor of the inner shell to keep such apertures unobstructed. A partition can also be provided to divide the inner shell to accomodate two pets.

9 Claims, 4 Drawing Figures

U.S. Patent   Dec. 24, 1985   Sheet 1 of 2   4,559,903
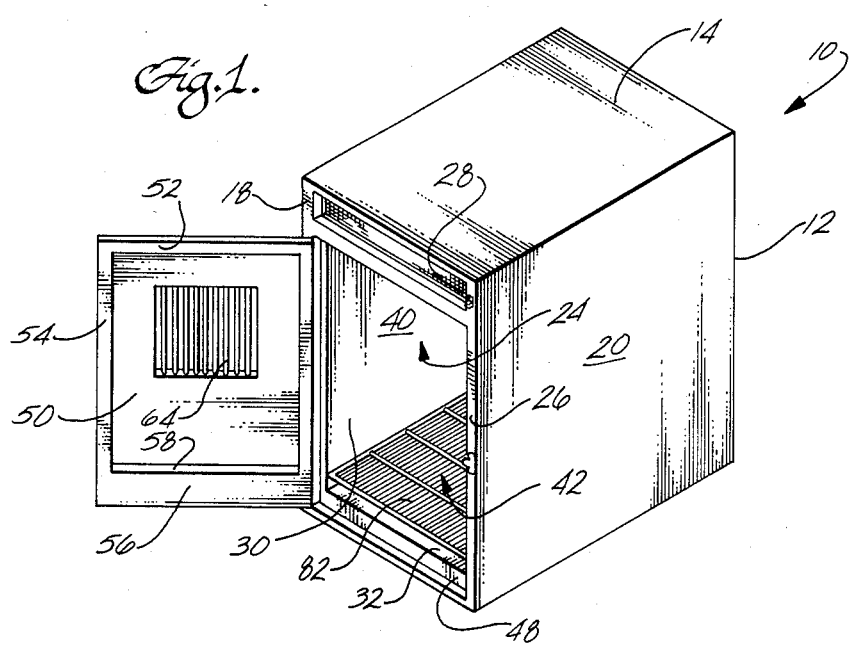
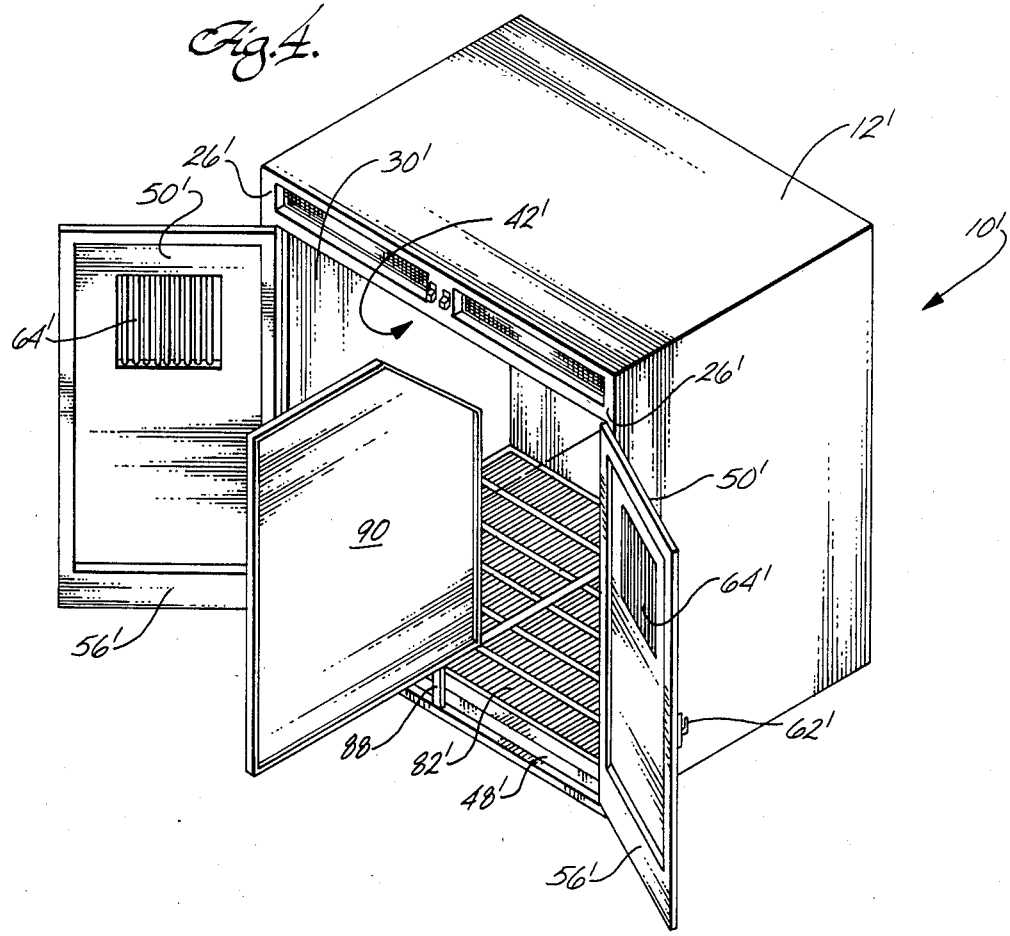

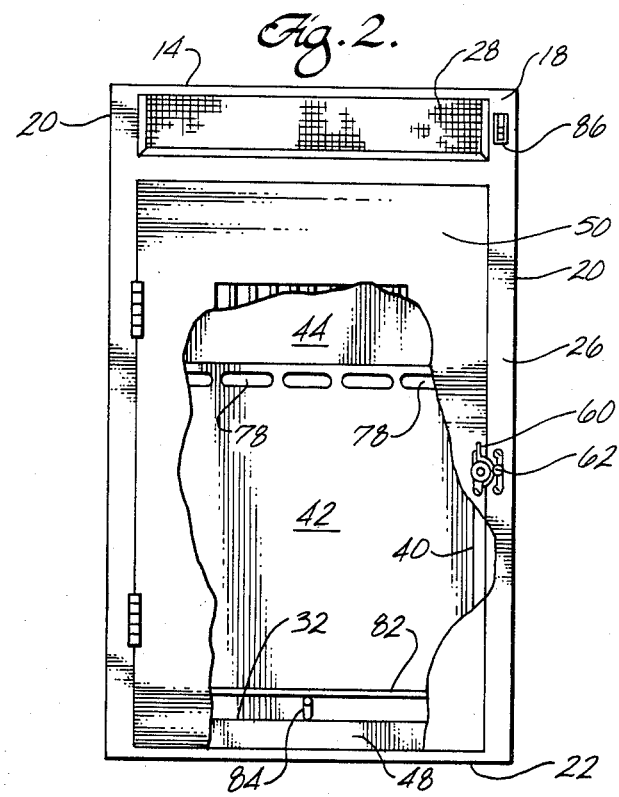
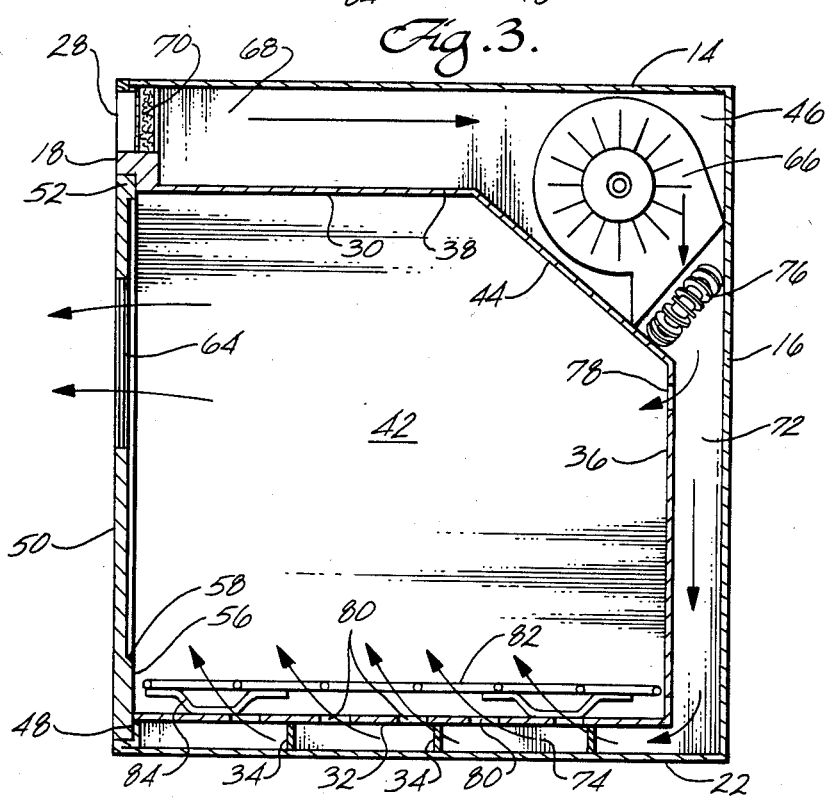

PET DRYER

FIELD OF THE INVENTION

This invention relates to dryers for pets.

BACKGROUND OF THE INVENTION

In the grooming of animals or for other purposes such as treatment under a veterinary's care, it may be beneficial to dry the animal's fur or skin. For example, in grooming a pet such as a dog, it is first necessary to shampoo the animal. After the animal has been shampooed and rinsed, the animal's fur is dried to not only prevent the animal from catching a cold but also to move the animal quickly to the next grooming stage, such as clipping. To dry the animal, groomers, veterinary assistants and the like have used hand-held dryers which are very similar to hand-held dryers for human use. A problem encountered with using hand-held dryers is that the animal must be held during the drying step, often in one hand while the groomer uses the hairdryer with the other hand. This can be an exerting, time-consuming task, since the animal may be resistent and attempt to escape the groomer. Sometimes two groomers may be required, one to hold the animal and the other to dry. Associated with this problem is that the groomer or groomers are not free to proceed with other tasks during the drying step due to the hand-held nature of the dryer and the required restraint of the animal. This translates into labor costs and slows the overall grooming process. The same holds true in the veterinarial setting, wherein an assistant would be required to attend and dry the animal, thereby taking the assistant away from other more important tasks.

SUMMARY OF THE INVENTION

There is, therefore, set forth in the present invention a pet dryer which confines and dries the animal to free the handler or handlers for other tasks. The dryer can also double as a kennel to retain the animal for a period of time. Toward this end, the pet dryer includes an outer shell and inner shell, the volume defined within the inner shell constituting a chamber to hold the animal. A door is provided for opening and closing the compartment to facitate disposing an animal within the dryer. The dryer also includes means for supplying heated air through the compartment for drying of the animal, these means including a blower to deliver outside ambient air to a discharge plenum. The plenum delivers the slightly superatmospheric air to the compartment. Preferably, the air is delivered to the compartment through a plurality of apertures at the bottom of the compartment and at the rear of the compartment opposite the door. Air entering the compartment is vented therefrom, preferably through a vent located on the door.

To heat the air, an electric heater is disposed within the discharge plenum. Accordingly, the air from the blower passes over and is heated by the heater and is thereafter delivered to the compartment for drying of a pet located therein.

More specifically and preferably, the space between the inner and outer shells defines both an inlet and the discharge plenum and a housing to hold the blower. Accordingly, ambient air is brought into the blower through the inlet plenum and is discharged through the outlet plenum for delivery to the compartment. By so creating the inlet and outlet plenums and the housing for the blower, the outer shell can conveniently be made in, for example, a cubicle or parallelepiped shape which lends itself to easy manufacture and provides a clean, appealing exterior appearance. Within the compartment a mesh grille is disposed above the lower apertures, the grille thereby supporting the animal above the floor of the inner shell. In this manner, the animal is prevented from covering any of the lower apertures. Further, the arrangement of the grille enables the compartment to be easily cleaned. To prevent the animal from trapping its paw between the grille and the door, the door may be provided with a lower rail to closely adjoin the grille when the door is closed.

In another embodiment of the invention, the outer and inner shells are enlarged, the dryer being provided with separated doors to reveal the enlarged compartment adapted to hold, for example, a large dog. In this embodiment, the dryer is provided with a pair of blowers and heaters for each half of the device. To add versatility to this enlarged version of the pet dryer, a partition may be inserted into the device to divide the compartment into a pair of side-by-side smaller compartments, each adapted to hold a pet. By virtue of the independently operated blowers and heaters, each or both of the smaller compartments may be provided with heated, drying air to dry one or two pets.

As can be appreciated, the pet dryer according to the present invention provides for deposit of the pet therein for drying, thereby freeing the groomer or assistant for other tasks during the drying of the pet. Further, in that the heated air is not recirculated but rather is a one-pass system, the humid air generated during the drying of the pet is discharged and not accumulated within the dryer.

BRIEF DESCRIPTION OF THE DRAWINGS

These and other features and advantages of the present invention will become appreciated as the same becomes better understood with reference to the following specification, claims and drawings, wherein:

FIG. 1 is a perspective front view of one embodiment of the pet dryer according to the present invention;

FIG. 2 is a front view of the dryer of FIG. 1 closed to retain a pet with portions thereof removed for clarity;

FIG. 3 is a side view of the dryer of FIGS. 1 and 2; and

FIG. 4 is a perspective front view of a further embodiment of the dryer adapted to accommodate larger pets or, in the alternative, one or two pets as desired.

DETAILED DESCRIPTION

Turning to the drawings, FIGS. 1, 2 and 3 show one embodiment of a pet dryer 10 according to the present invention. The dryer 10 is adapted to retain and dry an animal, thereby freeing the handler for other tasks. For example, in pet grooming salons after the animal has been shampooed it is preferred to dry the animal to prevent it from catching a cold and to speed up the overall grooming process. After drying, further processing such as trimming and the like may be provided to the animal.

The dryer 10 includes an outer shell 12 having a top panel 14, rear panel 16, front panel 18, side panels 20 and a bottom 22. While the outer shell 12 may be shaped to give the dryer an overall cubic or parallelepipedal shape, it is to be understood that other suitable shapes could be used. Preferably, the outer shell 12 is fashioned from sheet metal, the components of which being attached to one another by suitable means and preferably sealed. While the dryer 10 may be completely assembled before sale, it is to be understood further that the individual components of the dryer as herein set forth could be sold as a kit for assembly by the customer. Materials other than sheet metal could also be used.

In the front panel 18 there is an opening 24 such that the front panel defines a border 26 encircling the opening 24. The front panel 18 also includes above the border 26 a rectangular opening defining an inlet 28, the purposes of which will hereinafter become evident.

To retain the pet, the dryer 10 further includes, spaced within the outer shell 12, a generally closed inner shell 30. Again, while the shape of the inner shell 30 is shown in the drawings as generally cubical, it should not be deemed as a limitation upon its shape. Preferably, the inner shell 30 includes a floor 32 supported above the bottom 22 by a plurality of support beams 34. Upstanding from the floor 32 and spaced from the rear panel 16, the inner shell also includes a rear wall 36. Again, the rear wall 36 may be supported against the rear panel 16 by suitable support members. Extending from the rear wall 36 to the outer shell front panel 18, the inner shell 30 has a top wall 38 and side walls 40 interconnected between the rear wall 36, floor 32, top wall 38 and front panel 18. As shown in the drawings, the aforesaid walls cooperate to define a chamber 42 adapted to hold a pet. While the top wall 38 may be flat so as to give the chamber 42 a generally cubic shape, it is preferred that the top wall 38 include an angular portion 44 so as to define a prism-shaped compartment 46 at the top-rear of the dryer 10. Like the outer shell 12, the inner shell 30 is preferably fashioned from sheet metal making it strong and durable.

Adjacent the opening 24 the side walls 40, top wall 38 and floor 32 are flared transversely outward and forward to create an L-shaped sill 48.

To close the opening 24, which also opens into the chamber 42, the dryer 10 includes a door 50. The door 50 is hinged to the front panel border 26 as shown in FIG. 2 and is sized to be closely received by adjoining the sill 48. Accordingly, when the door 50 is closed, it registers into the plane defining the dryer front panel 18, as shown in FIG. 3. Like the outer and inner shells, the door 50 is again preferably constructed from sheet metal and is generally planar, including at its inner surface upper, side and bottom rails 52, 54 and 56, respectively, skirting the perimeter of the door and arranged to abut the sill 48 as best shown in FIG. 3. The bottom rail 56 is preferably enlarged, having an uppermost bevel 58, the purposes of which will hereinafter become evident.

To provide for closing of the door, the door 50 and front panel border 26 cooperatively include latching means embodied as a handle 60 on the door 50 and a catch 62, positioned along the border 26. Accordingly, after a pet has been positioned in the compartment 46, the door 50 may be closed over the opening 24 to closely abut the sill 48 and thereafter the door may be latched to prevent the animal from escaping.

To provide means for inspecting the animal within the chamber 42, the door 50 includes a barred window 64, which also functions as a vent. The bars across the window 64 prevent the animal from escaping from the chamber.

To dry the animal positioned within the chamber 42 of the dryer 10, the dryer includes means for supplying heated air to the chamber 42. For this purpose a blower 66 is provided. While the blower 66 may be positioned on the exterior of the dryer 10 or may be completely apart therefrom, preferably the blower 66 is disposed in the compartment 46 at the top rear of the dryer 10. Suitable brackets (not shown) may be used for securely mounting the blower within the compartment 46. Mounting the blower in the compartment 46 gives the dryer 10 a clean, appealing outer appearance and safely houses the blower. For a chamber having a volume of about 12 cu ft, a 465 cu ft/min blower has been found adequate.

To admit outside air into the compartment 46 and the blower 66, the space between the top wall 38 of the inner shell 30 and the top panel 14 of the outer shell 12 is left open to define an inlet plenum 68. The inlet plenum 68 opens to the outside of the dryer 10 at the inlet 28 and at the other side communicates with the compartment 46 as best shown in FIG. 3. The inlet plenum 68 terminates at the inner surface of the side panels 20 of the outer shell 12. The side walls 40 are secured and sealed to the side panels 20.

To prevent foreign material, such as hair and the like from entering the inlet plenum 68 and finding its way to the blower, a filter 70 may be disposed across the inlet 28. In the preferred embodiment the filter 70 is of the wire-mesh type.

The air admitted to the blower 66 from the inlet plenum 68 is slightly compressed and is discharged into a discharge plenum 72 which communicates with the discharge of the blower 66. Preferably the discharge plenum 72 is defined by the space between the inner shell rear wall 36, outer shell rear panel 16 and the inner panel sidewalls 40, which extend between the front and rear panels 18 and 16 of the outer shell.

The discharge plenum 72 also includes a lower portion 74 defined between the inner shell floor and sidewalls 40 and the outer shell bottom 22. The beams 34 supporting the floor 32 above the bottom 22 are conveniently provided with passages to permit the free flow of air through the lower portion 74.

To heat the air supplied to the chamber 42 heating means are provided, preferably in the discharge plenum 72. While these heating means may be of any suitable design, it has been found that an electric heater 76 is preferred to provide portability to the dryer 10. As shown in FIG. 3, the heater 76 is disposed in the discharge plenum 72 at the discharge of the blower 66. In the exemplary dryer set forth above, having a chamber 42 of 12 cu ft and a blower capacity of 465 cu ft/min, it has been found that a 1,000 watt, 115 volt heater with radiating fins provides for the aforementioned heating of the air.

As can be appreciated, the cool air drawn in through the inlet plenum 68 is slightly compressed by the blower and driven past the heater 76 where it is heated to a temperature of approximately 10°–15° F. above ambient temperature and thereafter supplied through the discharge plenum to the lower portion 74. To admit the heated air into the chamber 42 the inner shell rear wall 36 includes a row of apertures 78 disposed proximate the juncture between the rear wall and top wall 38. Further, the inner shell floor 32 includes several spaced rows of apertures 80 being, for example, 45 total apertures in number, each providing a path for the heated air to enter the chamber 42 from the discharge plenum lower portion 74. As can be appreciated, the apertures 80 in the floor 32 blow upwardly toward the animal for drying, whereas the apertures 78 in the rear wall 36 blow somewhat laterally to prevent the creation of a dead spot (i.e., a location with no air circulation) within the chamber 42. The heated air entering the chamber 42 is discharged from the window 64 thereby providing a continuous circulation of heated air for drying of the animal. The air discharged from the window 64 carries with it the moisture picked up by the air as it dries the animal. It is believed that this one-pass system is better suited to drying the animal quickly than a system which would recirculate the air. A recirculation system would humidify the air such that efficient drying could not take place.

To prevent the pet from covering the apertures 80 in the floor 32 and to facilitate cleaning of the dryer 10, a grille 82 of, for example, wire mesh may be positioned on and over the floor 32 as shown in the drawings. The grille 82 includes a plurality of legs 84 for spacing it above the floor 32. Accordingly, the animal positioned within the chamber 42 is supported above the floor 32 by the grille 82 assuring complete delivery of the heated air through the apertures 80 for efficient drying of the animal. The grille 82 may be easily removed from the chamber 42 from the cleaning thereof and of the dryer 10.

Viewing FIG. 3, it can be appreciated that the bottom rail 56 of the door 50 closely adjoins the frontmost extent of the grille 82. In this manner, sliding movement of the grill 82 within the chamber 42 is prevented. Further, and perhaps more importantly, since the pet may attempt to escape from the dryer 10 by scratching at the door 50, the space between the door 50 and grill 82 is minimized by virtue of the bottom rail 56 preventing the animal's paw from being trapped therebetween and causing injury.

To operate the blower 66 and heater 76 an ON/OFF switch 86 may be conveniently disposed at the front panel as shown in the drawings. Electric power for these components, which can be conveniently provided from any home electrical outlet, is interconnected through the switch to the blower and heater, thereby providing the ON/OFF function thereof.

Turning to FIG. 4, a further embodiment of a dryer according to the present invention is shown. Features of the embodiment of the dryer 10 shown in FIG. 4 which are similar to those described above will carry the prime (') designation.

The dryer 10' of FIG. 4 has an outer shell 12' and an inner shell 30' to define an enlarged chamber 42' to hold larger pets or, as described in detail below, to hold one or several pets. To open the dryer 10' for positioning an animal or animals therein, a pair of identical separating doors 50' are hingeably mounted to opposite sides of the border 26', the doors 50' being adapted to close together and latch and open to reveal the chamber 42'. To provide for the aforesaid latching of the doors 50', one door has mounted thereon a latch handle, whereas the other door includes a catch 62'. As shown in the drawings, each of the doors 50' includes a window 64' and a bottom rail 56'.

The dryer 10' is symetrical about a medial vertical plane including at that plane a wall between the inner and outer shells 30' and 12' to, in essence, divide the dryer 10' into two independent halves, each having a structure and function similar to that described above.

Each of the operative halves of the dryer 10' include a blower, heater, inlet and discharge plenums and the other equipment necessary for delivering heated air into the chamber 42'. Further, each of the operative halves of the dryer 10' includes a grille 82', the grilles 82' mutually adjoining a track 88 positioned at the medial plane of the dryer 10' and extending from front to rear through the chamber 42'.

To dry a large animal the animal is positioned in the chamber 42', the doors 50' are closed and latched and both of the blowers (one each for each operative half of the dryer 10') are powered as are the heaters, thereby delivering heated air to the chamber 42' for drying the animal. The heated air vents from the chamber via the windows 64'. Should the dryer 10' be desired to dry one or two pets, a partition 90 may be inserted into the chamber 42' to bisect the chamber 42' and thereby create separate, side-by-side smaller chambers. In this mode a pet may be positioned in one or both of the chamber halves, the doors closed and the drying means activated to dry the pet.

While we have shown and described certain embodiments of the present invention, it is to be understood that it is subject to many modifications without departing from the spirit and scope as set forth in the following claims.

What is claimed is:

1. A pet dryer comprising:
    a housing including a closed chamber to hold a pet, the housing including a door operable to open the chamber for locating a pet therein and for closing the chamber, a vent disposed in the door, the chamber including a floor and a rear wall opposite the door, the rear wall including at least one aperture disposed above the floor and the floor including at least one other aperture; and
    means for supplying heated air to the chamber from each rear wall aperture for drying particularly the torso and head of the pet and from each floor aperture for drying the feet, legs, torso underside and head, the heated air circulating through the chamber and exhausting therefrom through the vent.

2. The dryer of claim 1 wherein the housing is defined by an outer shell and the chamber is defined by an inner shell, the inner shell spaced within the outer shell to define a closed discharge plenum communicating with said apertures, the supply means providing heated air to the discharge plenum and through the apertures for drying the pet.

3. The dryer of claim 1 wherein the blower is disposed in a compartment defined between the outer and inner shells, the outer and inner shells spaced to define a closed inlet plenum to supply outside air to the blower.

4. The pet dryer of claim 1 further including a grille disposed above the floor to support the pet and prevent the pet from covering any of said floor apertures and from standing in moisture collected at the floor.

5. A pet dryer comprising:
    an outer shell;
    an inner shell spaced within the outer shell to define an inlet plenum, a compartment and a discharge plenum, the inner shell defining a chamber to hold the pet and having a floor and a rear wall, the rear wall including a plurality of apertures spaced above the floor to be directed at the pet's torso and head and the floor including a plurality of apertures directed at the pet's underside, said apertures providing communication between the discharge plenum and the chamber;

door means opposite the rear wall for opening the outer and inner shell to reveal the chamber for positioning of a pet therein, the door including a vent;

a blower disposed in the compartment, the blower receiving outside air via the inlet plenum and discharging air into the discharge plenum for delivery of air through said apertures to the chamber, such air circulating through the chamber and exiting the chamber through the vent; and means for heating the air supplied to the discharge plenum.

6. The dryer of claim 5 further including a grille disposed above the floor to support the pet and prevent obstruction of such apertures by the pet.

7. A dryer for one or more pets comprising:

an outer shell;

an inner shell spaced within the outer shell to define at least one inlet plenum, a compartment and a pair of closed discharge plenums, the inner shell defining a chamber to hold at least one pet and having a floor and a rear wall, the rear wall including a plurality of apertures disposed above the floor and at either side of the center plane for the chamber to be directed at the pet's torso and head and the floor including a plurality of apertures arranged to either side of a center plane directed upwardly at the pet's legs and feet, each discharge plenum communicating with the apertures of one of said chamber sides;

a pair of side-by-side door means for opening and closing each side of the chamber for depositing a pet in the chamber, each door including means for venting the chamber to outside of the dryer;

a pair of blowers disposed in the compartment, each blower independently driven to receive outside air via the inlet plenum and discharge air into a corresponding discharge plenum for delivery through said apertures to one of said chamber sides, such air exiting the chamber through the venting means; and means for heating the air supplied to each discharge plenum.

8. The dryer of claim 7 further including a removable partition adapted to be positioned within the chamber at the center plane to divide the chamber into separate independently operable halves, each adapted to hold a pet for drying.

9. The dryer of claim 8 further including a pair of grilles, each disposed above the floor in a chamber half to support a pet and prevent obstruction of said apertures.

* * * * *